US008041372B1

(12) United States Patent  
Minns et al.

(10) Patent No.: US 8,041,372 B1  
(45) Date of Patent: Oct. 18, 2011

(54) SELECTING DATA IN A MOBILE INFORMATION SYSTEM

(75) Inventors: Steve Minns, San Fransicso, CA (US); Rupen Chanda, San Francisco, CA (US); Jack Chen, Belmont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 896 days.

(21) Appl. No.: 11/945,253

(22) Filed: Nov. 26, 2007

(51) Int. Cl.
*H04W 24/00* (2009.01)
*H04L 29/06* (2006.01)
*G06F 17/20* (2006.01)

(52) U.S. Cl. ............... 455/456.3; 455/414.3; 704/8
(58) Field of Classification Search ........... 455/414.3, 455/456.3, 456.6; 704/8
See application file for complete search history.

(56) References Cited

U.S. PATENT DOCUMENTS

| | | | |
|---|---|---|---|
| 6,564,003 B2 * | 5/2003 | Marko et al. ............... 386/69 |
| 7,110,373 B2 | 9/2006 | Lee |
| 7,194,255 B2 * | 3/2007 | Boman et al. ............... 455/414.1 |
| 7,395,385 B2 | 7/2008 | Cobley |
| 7,757,227 B2 * | 7/2010 | Duplessis et al. ............ 717/173 |
| 2003/0005019 A1 | 1/2003 | Pabla et al. |
| 2005/0009538 A1 * | 1/2005 | MacKay et al. ............ 455/456.3 |
| 2005/0144152 A1 * | 6/2005 | Punaganti et al. ............ 707/1 |
| 2005/0286856 A1 | 12/2005 | Aerts |
| 2006/0107327 A1 | 5/2006 | Sprigg et al. |
| 2007/0130331 A1 | 6/2007 | Kao et al. |
| 2007/0198698 A1 | 8/2007 | Boyd et al. |
| 2007/0199019 A1 | 8/2007 | Angiolillo et al. |
| 2008/0076573 A1 | 3/2008 | Loehrer |
| 2008/0104710 A1 | 5/2008 | Jorden et al. |
| 2008/0243998 A1 * | 10/2008 | Oh et al. ............... 709/203 |
| 2008/0319734 A1 * | 12/2008 | Kim ............... 704/8 |

FOREIGN PATENT DOCUMENTS

WO  WO 2004054171 A1 * 6/2004

OTHER PUBLICATIONS

"What is Push Technology?", Whatis.com, retreived from internet, updated Jul. 31, 2001.*
"What is triangulation?", Whatis.com, retreived from internet, updated Jul. 9, 2001.*
Chanda, "Embedded Document within an Application", Pending U.S. Appl. No. 11/567,111, filed Dec. 5, 2006, 24 pages.
Hosmer, et al., "System and Method for Developing Information for a Wireless Information System", Pending U.S. Appl. No. 10/791,299, filed Mar. 1, 2004, 26 pages.
Morris, et al., "Mobile Rich Media Information System", Pending U.S. Appl. No. 10/791,298, filed Mar. 1, 2004, 43 pages.
Qualcomm Incorporated, "Binary Runtime Environment for Wireless", May 8, 2003, 43 pages.
Rodgers, et al. "Bandwidth Management System", Pending U.S. Appl. No. 10/791,311, filed Mar. 1, 2004, 27 pages.

* cited by examiner

*Primary Examiner* — Dwayne Bost
*Assistant Examiner* — Larry Sternbane
(74) *Attorney, Agent, or Firm* — Fish & Richardson P.C.

(57) ABSTRACT

Systems and methods, including computer software products, can be implemented for selecting data on a mobile device on which multiple channels are defined. Each channel can be adapted to receive a predetermined type of content for access on the mobile device. Multiple languages may also be defined on the device, and multiple data sets for at least one of the channels are received, wherein each data set is configured for presentation in a different one of the languages. One of the data sets may be selected based on a current location.

23 Claims, 3 Drawing Sheets

US 8,041,372 B1

SELECTING DATA IN A MOBILE INFORMATION SYSTEM

BACKGROUND

The present disclosure relates to selecting data in computer systems in general and more specifically relates to selecting data in mobile information systems. In a mobile information system, subscribers may register with a wireless service provider to receive various types of content from the service provider on their mobile devices. The subscriber may have capabilities in more than one language. The subscriber's mobile device may include a resident interactive multimedia application environment that includes capabilities for displaying graphics, video, animation, audio, and the like. Examples of such interactive multimedia application environments are the different versions of the Adobe® Flash®-based platform. Many different types of content are provided to mobile devices equipped with such application environments.

SUMMARY

This specification describes technologies relating to memory allocation in a mobile device.

In general, one aspect of the subject matter described in this specification can be embodied in a method that includes defining multiple channels on a mobile device. Each channel may be adapted to receive a predetermined type of content for access on the mobile device. Multiple languages may also be defined. Multiple data sets for at least one of the channels are received, and each data set is configured for presentation in a different one of the languages. One of the data sets is selected based on a current location. Other embodiments of this aspect include corresponding systems, apparatus, and computer program products.

In another general aspect, a system includes one or more databases operable to store contents for multiple available channels. The content may include multiple data sets for delivery to mobile devices based on a registration of each mobile device to receive updates for one or more channels. One or more servers are adapted to receive an identification of a multiple languages associated with a particular mobile device and automatically identify data sets stored on the database. Each identified data set is configured for presentation in a different one of the languages. The identified data sets may be automatically delivered to the particular mobile device based on the registration of the particular mobile device to receive content for one or more channels.

These and other embodiments can optionally include one or more of the following features. Each of the multiple languages can be associated with one or more locations. One of the data sets is selected based on the current location by selecting the data set configured for presentation in the language associated with the current location. A new current location can be identified, and a different one of the data sets can be selected based on the new current location. One or more of the data sets can be further configured for the mobile device based on at least one characteristic of the mobile device. The data sets can be received from a server, and the server can include one or more data sets configured to be presented in a language other than the multiple languages. The current location can be a geographic location of the mobile device, and the geographic location can be automatically identified by a wireless global information system or by information received at the mobile device from a wireless network. One or more of the data sets can include a reference to a shared library, and the shared library can include data configured for presentation in one or more of the languages. At least one of the data sets can be presented by executing the data set using a media player on the mobile device.

Particular embodiments of the subject matter described in this specification can be implemented to realize one or more of the following advantages. Content for each channel may be available in multiple languages, and a mobile device may automatically select content configured for presentation in a particular language based on the current location of the mobile device. The selection may be based on an association of the particular language with the current location. Content configured for presentation in each of a large number of languages may be automatically generated and readily available to a user on a server, but only the most relevant subset of that content may be stored on the limited memory available on an individual mobile device. The most relevant subset may be the content configured for presentation in a subset of languages identified by the user. By storing on the mobile device content configured for presentation in each of the user-identified languages, the user may efficiently access content configured for presentation in any one of a set of preferred languages, and the mobile device may efficiently select content based on a current location.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
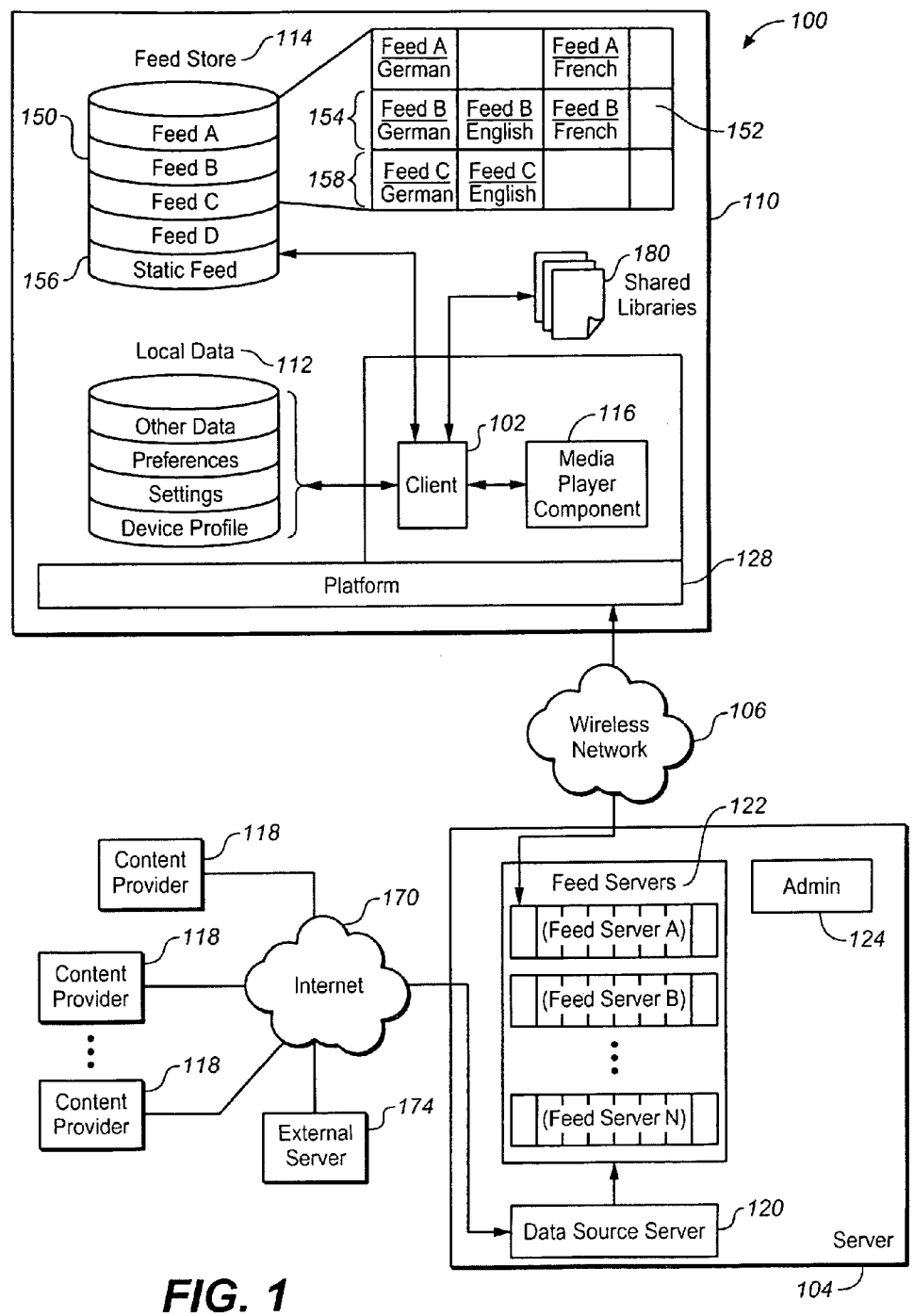
FIG. 1 is an illustration of an example mobile information system.

When a computer system, such as a mobile information system, is configured to provide content to a user device, such as a mobile device, the computer system may implement data selection to access content in an appropriate language. In a mobile information system, subscribers may register with a wireless service provider to receive various types of content from the service provider on their mobile devices. Third party content providers may also register or contract with the wireless service provider to provide various types of content to subscribers over a network, such as the Internet, via the service provider. The subscriber's mobile device may include a resident interactive multimedia application environment that includes capabilities for displaying graphics, video, animation, audio, and the like. Examples of such interactive multimedia application environments are the different versions of the Adobe® Flash®-based platform. Content provided to mobile devices equipped with such application environments are sometimes delivered in executable file formats such as the precisely described SWF (small web format) binary vector graphics format. SWF provides a compact, TAG-based, easily extendible format that supports streaming, bitmap and vector graphics, and scripting. Content may include other data or files, such as a feature film, an executable software update, or a software extension.

In some implementations, wireless service providers deliver content to the mobile devices of their subscribers in the form of information channels. Each information channel may originate with the wireless service provider or may originate with third party content providers. When a subscriber subscribes to a particular information channel, the wireless service provider delivers content associated with that information channel to the subscriber's mobile device. The content may be delivered as a channel feed to a file system (i.e., a feed store) located on the mobile device. The feed store may be logically divided into separate compartments or memory allocations with each channel assigned its own compartment on a static or dynamic basis. Periodically, the wireless service provider may deliver channel content updates to the mobile device. The updates may be provided according to a predetermined schedule, in response to a request from the mobile device, in response to an availability of updates at the content provider, in response to an expiration or consumption (e.g., viewing) of content previously delivered to the mobile device or in some other way. Because the channel content is stored locally on the mobile device and frequently updated, the subscriber is usually able to access the channel without having to wait for channel content or content updates to be delivered over the network. The channel content may be automatically delivered to the mobile device in the background (i.e., without a specific user request and/or while the mobile device is otherwise idle or being used to view other channels or perform other operations).

For example, a wireless service provider may offer several different information channels to its subscribers. Some information channels may be freely available to all subscribers, while other information channels may require premium subscriber status. The content of some information channels may originate with the wireless service provider. The content of other information channels may originate with third parties that have registered with the service provider. The content of still other information channels may originate with other sources. The offered information channels may include a premium news channel. If a subscriber has subscribed to the premium news channel, then the wireless service provider may establish a channel feed to periodically or sporadically deliver content from the premium news channel to the feed store located on the subscriber's mobile device. When the subscriber accesses the premium news channel, processes on the mobile device retrieve the content from the feed store. Even if the subscriber rarely or even never accesses the premium news channel, the channel feed may provide for regular updates of channel content in the feed store based, for example, on an expiration of content and/or an availability of new content.

In some implementations, content for a channel may be available in multiple languages, and the mobile device may select content configured for presentation in a particular language based on the current location of the device. The server may generate, retrieve, or otherwise aggregate content configured for presentation in a large number (e.g. 50) of languages (e.g. Cantonese, French, German, English, Japanese, etc.). In some implementations, only the content configured for presentation in a subset of languages may be received by a particular mobile device. For example, if a user identifies the languages French and German, that user's mobile device may receive content in both French and German. In this manner, content configured for presentation in all of the large number (e.g. 50) of languages may be readily available to a user, but only the most relevant subset of that content may be stored on a particular user's mobile device. For example, the most relevant subset may be the content configured for presentation in the languages identified by the user. Moreover, by storing locally (on the mobile device) content configured for presentation in the languages identified by the mobile device user, the user may efficiently access content configured for presentation in any one of a user-preferred set of languages (i.e. without receiving further updates from a server).

This ability to select particular languages for content on a mobile device may be useful if a user desires content to be presented in different languages depending on the user's current location. A user may identify a plurality of languages, and each identified language may be associated with one or more locations. The mobile device may select content that is configured for presentation in the language associated with a current location of the mobile device. For example, if a user identifies the languages French and German, the mobile device may receive News channel content configured for presentation in French and the same News channel content configured for presentation in German. When the user is in a country associated with German, such as Germany, the mobile device may select the News channel content configured for presentation in German. However, when the user enters a country associated with French, such as France, the mobile device may select the News channel content configured for presentation in French. This selection of particular languages may be based on information transmitted to the device from the wireless telephone or other network in the area. The user may associate a language with one or more locations, or a language may be automatically associated with one or more languages. Additionally, when the mobile device is in a location that is not associated with a particular language, the mobile device may select content configured for presentation in a default language.

Channel content may be in the form of text, images, vector graphics, bitmaps, frame-based animation, video, or in any other format supported by the mobile information system, and may include executable scripts or other sequences of instructions. Depending on the format of the channel content, an application running on the mobile device, such as a media player or other type of media player component, may be invoked to run the script, execute the instructions, or otherwise display the content. One example of such a mobile information system is described in U.S. patent application Ser. No. 10/791,298, filed Mar. 1, 2004 and entitled "MOBILE RICH MEDIA INFORMATION SYSTEMS," the entire contents of which are hereby incorporated by reference.

FIG. 1 illustrates an example system 100 for providing system security by associating permissions with content. System 100 represents a mobile information system for delivering mobile data services to mobile device 110. The mobile information system represented in system 100 is administered by a wireless service provider, such as T-Mobile®, Verizon Wireless®, or Sprint Nextel®, that operates wireless network 106. Subscribers to the wireless service may receive external content from content providers 118 through mobile device 110. In some implementations, mobile device 110 is a mobile phone. In other implementations, mobile device 110 is a personal data assistant, a laptop computer, or any other device suitable to receive content over wireless network 106. Mobile device 110 is configured to store information including local data 112 and feed store 114. Local data 112 may include settings, preferences, and device profiles as well as various other types of local data (e.g. call log, contacts, favorites, calendar appointments and reminders, task lists, and the like). Settings may include default settings and/or user-defined settings for mobile device 110, such as ring tones and screen appearance settings. Preferences may include default preferences and/or preferences selected by the user of mobile device 110, such as connection preferences and/or language preferences. Preferences may specify a language associated with one or more locations, for example, by default or based on user input. Preferences may also specify a default language for locations that are not associated with a particular language. Device profiles may include data related to mobile device 110, such as screen size, an identification of a device model and software versions. Settings, preferences, and device profiles represent examples of data that may be stored as local data 112 on mobile device 110. Individual implementations may include none, some, or all of these examples, in addition to other types of local data not discussed.

Local data 112 may define client capabilities that are specific to the mobile device 110. Client capabilities may specify some or all of the information necessary to generate or identify content that is specifically configured for the mobile device 110 and for the preferences of the mobile device user. For example, client capabilities may specify a screen size of 2.5 inches and the languages French and German. Client capabilities may be received by server 104 with a request for updates over wireless network 106, or client capabilities may be received by server 104 over internet 170 or stored locally at server 104. For example, based on the received client capabilities, server 104 may identify content configured for presentation in French on a 2.5 inch screen and content configured for presentation in German on a 2.5 inch screen. Server 104 may send the identified content to client 102.

Mobile device 110 may also be configured to store shared libraries 180. Generally, a shared library may include resources such as data, code, programs, subprograms or other information that may be accessed by multiple applications. Shared libraries 180 may include, for example, shared runtime libraries. Shared libraries 180 may include static or dynamic link libraries or SWF files. Shared libraries 180 may include a plurality of shared runtime libraries, each of which defines text, images, and other data configured for presentation in a particular language or in multiple languages. Channel content, such as an application, may include a link to a specific shared library 180. For example, channel content configured to display strings or some other set of resources (e.g., images) for presentation may include a link or pointer to a shared runtime library. Content may be dynamically selected from the shared runtime library based on the language to be used in a particular locale. Thus, resources may be selected dynamically for presenting particular channel content according to the current location of a mobile device. In this manner, one set of libraries for use in presenting the channel content may be used when the device dynamically determines that content is to be presented in English and a different set of libraries may be used when the device dynamically determines that content is to be presented in French. Shared libraries 180 may be stored locally with local data 112 or feed store 114, or they may be received and/or updated from server 104.

At a high level, server system 104 may receive information from content providers 118, organize the retrieved information along with some or all of any associated memory allocations into individual information channel feeds, and deliver the information channel feeds to client 102. Client 102 may then store the information channel feeds in feed store 114. A feed may include a plurality of data sets, where each data set is a subset of content for a single information channel. Each of the data sets included in a feed may be configured to present the channel content in a different language. For example, channel B content 154 may include channel B content in German, English, and French, as illustrated. The particular languages for which the data sets included in channel content are configured may be based on languages identified by the user in local data 112 (e.g. in preferences) and/or in client capabilities. However, a data set configured for presentation in some of the identified languages may not be available for all channels. For example, channel C content 158 includes channel C content in German and English but not French. In addition to the dynamic channel feeds received from server system 104, feed store 114 may also contain one or more static feeds 156. Static feed content and associated permissions may be preloaded on mobile device 110 instead of delivered by server system 104. In addition to providing information, channel feeds may also be used to provide services, such as a home page user interface, calendar user interface and services, or other user interfaces or specialized application services. From a security standpoint, there may be little or no difference between static feeds and dynamic feeds or between information channels and service channels.

When a subscriber attempts to access a particular information channel, for example, channel B 150, client 102 may retrieve channel B content 154, a subset of channel B content 154 (e.g. a subset that is a data set configured for presentation in a particular language), and/or channel B metadata 152 from feed store 114. Client 102 may select a particular data set from channel B content 154 based on a current location. Depending on the format of channel B content 154, client 102 may provide a subset of content 154 to media player component 116. If content configured for presentation in the language associated with the current location is not available, client 102 may provide content configured for presentation in a different language. In some implementations, each data set included in channel B content 154 is a SWF file and media player component 116 is an Adobe® Flash®-based media player component that provides media player functionality. Client 102 and media player component 116 may form two parts of a single virtual machine 108 running on mobile device 110. The virtual machine 108 may run on a device platform 128. Client 102 and media player component 116 may then be programmed to run on the virtual machine 108.

In some implementations, the functionality of media player component 116 may be extended. Such an extension may be used to expand the functionality of media player component 116, such as by providing support for additional commands or services. For example, a service provider may wish to provide channel content that displays or otherwise accesses or manipulates data from local data 112 such as a call log. The service provider may develop a custom command or instruction that can be provided in the channel feed and stored in feed store 114. Such a command may be unrecognized by unextended media player component 116 and client 102. The service provider may then install a custom extension on mobile device 110 that recognizes and performs the custom command or instruction, effectively increasing the number of commands or instructions recognized by media player component 116. The extension may be implemented through an application programming interface (API) supported by the client 102, which defines certain types of messages that can be passed between the client 102 and the extension. In another example, a third party content provider may develop a custom command or instruction to perform some other activity. An extension may be a software module that is distributed preinstalled on mobile device 110 or downloaded to mobile device 110, for example over wireless network 106. Media player component 116 may access shared libraries 180, for example, according to links included in channel content.

Media player component 116 may retrieve from shared libraries 180 text, images, and/or other types of data that are specifically configured for presentation in a specific language and/or in a specific format or style. Which libraries 180 are selected may depend on the specific language and/or the specific format or style that is dynamically selected according to current location.

Client 102 provides a framework for displaying and managing content received on mobile device 110, including content received from server system 104. Client 102 may be responsible for the caching of received content, for communication with server system 104, and for various other tasks. Client 102 may manage subscriber input and memory devices 112 and 114. In addition, client 102 may manage security features that protect the privacy of subscribers and content and prevent unauthorized parties from interfering with the service. In some implementations, client 102 is distributed preinstalled on mobile device 110, while in other implementations, client 102 or an update to client 102 is downloaded to mobile device 110, for example over wireless network 106.

Client 102 may access media player component 116 to render a user interface and content and to perform scripting operations. In some implementations, media player component 116 is a media player that supports vector graphics, bitmaps, and frame-based animation, as well as text input and dynamic text. Media player component 116 may be able to process files, such as SWF files, in which content providers 118 use native device fonts or embed arbitrary fonts. Media player component 116 may also support scripting integration with mobile device 110 capabilities, including keypad navigation, button presses, notification, messaging, and media playback, as well as integration with general mobile device 110 operating system functionality. This enables client 102 to be integrated with other mobile device 110 applications and functionalities. Scripting may be accomplished with ActionScript™ or any other suitable scripting language supported by media player component 116. Client 102 may select a particular data set included in channel content based on a current location or based on a particular language associated with a current language. Client 102 may also identify a new current location and select a different data set (e.g. included in the same channel content) based on the new current location. Client 102 may send an identification of client capabilities to server 140.

Client 102 may be configured to interact with mobile device 110's underlying features and applications through a set of scriptable commands. In some implementations, client 102 may interact with native functions of the mobile device 110 by interfacing with a platform 128 of the mobile device 110. Such commands may enable channel content to retrieve and set subscriber preferences, provide time and date information from the host environment, or launch external applications such as a browser or media player. In some implementations, upon launching an external application, the subscriber is instantly transferred to that application. Client 102 may maintain the state of the user interface so that the subscriber can return to the same screen of client 102 from which the external application was launched, creating a perception of an integrated experience.

Mobile device 110 may have a fully customizable user interface design, through feed store 114, that consists of individual Flash® elements (i.e., SWF files) independent of client 102's core functionality. In some implementations, the SWF files enable subscribers to use mobile device 110's soft keys to control navigation and client 102's meta functions such as setting preferences. Feed store 114 may be updated over wireless network 106 and may use an asynchronous communication protocol that updates all content through a background delivery mechanism that is transparent to subscribers. This enables subscribers to continue browsing one information channel, for example, channel B 150, while a different information channel is updated in the background. Subscribers can also change their preferences when offline; the transaction-based client-server protocol may ensure that such requests will be fulfilled the next time client 102 connects to server system 104. Communications between client 102 and server system 104 may be facilitated through libraries native to platform 128. Platform 128 represents the device-dependent operating system running on mobile device 110. Example implementations of platform 128 are BREW® OS, Symbian OS™, BlackBerry® OS, Windows Mobile® OS, Palm OS®, Linux, Windows XP®, Mac OS®, and the like.

When running in background mode, client 102 may minimize battery usage while periodically receiving updates from server system 104. In some implementations, subscribers can choose between a number of battery-conserving update options, for example, always update, update only when battery strength is above a certain level, and never update. If supported by platform 128, different applications may be running simultaneously. In such cases, client 102 may minimize its use of memory resources when other applications are active. For example, client 102 may have a hibernate mode in which it consumes only a fraction of its normal operating memory. Client 102 may also be configured to limit the number of information channels to which a subscriber may subscribe. When this limit is reached, client 102 may require a subscriber to remove an information channel before a new information channel may be added. Client 102 may also support Short Message Service (SMS) signaling, allowing server system 104 to awaken client 102 and initiate an immediate content update in the case of important events such as breaking news or an immediate retraction of inappropriate content.

Server system 104 may include clusters of feed servers 122 and data source servers 120, as well as report server 126. Report server 126 may allow service providers to monitor server activities and network traffic and may be integrated with other enterprise reporting solutions. The client-server architecture of system 100 may use clustering technology to help ensure performance, reliability, and scalability while minimizing deployment complexities through a flexible integration framework. Server system 104 may aggregate content from external content providers 118 received over the Internet 170 and organize the content into channel content feeds. Server system 104 may filter content feeds based on user preferences, mobile device 110 types, and access controls. Server system 104 may deliver the content feeds to client 102 over wireless network 106. Data source servers 120 may retrieve, normalize, and aggregate content from the web servers of content providers 118, may transform various formats of retrieved content, for example, into a common XML format, and may pass the content on to feed servers 122 for delivery to client 102. Retrievals may be scheduled at predetermined intervals, at which times only differential updates may be collected. Data source servers 120 may be configured to handle content feeds in various formats (e.g., RSS, Atom, XML, etc.). Content feeds may support embedded content types including, for example, text, images, and SWF files.

Server 104 may include content configured for multiple client capabilities. Server 104 may generate, retrieve, or otherwise aggregate many different data sets for the same channel content, where each data set is configured differently. For example, each data set may be configured for presentation in a specific language, on a specific screen size, and using a specific software. Server 104 may include content configured for every combination of client capabilities, or server 104 may only include content configured for a subset of client capabilities. For example, server 104 may include content configured for a subset of the most frequently occurring client capabilities.

Using system 100, service providers may be able to provide targeted data service offerings to subscribers. Service providers may be able to promote specific content bundles to certain segments such as business people, teens, casual users, and others. Service providers may be able to make specific content bundles available to all subscribers in, for example, a channel guide, allowing subscribers to select specific content bundles. To increase network efficiency, server system 104 may operate in an occasionally connected data model and may use a communication protocol that enables differential updates, minimizing unnecessary exchanges of data between server system 104 and client 102. For example, in the case of a weather channel, only an update to the temperature may be required, while all other content, such as images, video, or forecasts, remains the same.

Server system 104 may be equipped with an administrator 124 providing the functionality required to manage the servers, including channel administration, subscriber administration, and system management. Using administrator 124, service providers can check, for example, the amount of network traffic each channel generates, deactivate poorly performing channels, and dynamically provision, modify, or remove channels, among other tasks. Administrator 124 may be implemented as automated processes and may also provide an interface for non-automated (i.e. human initiated or controlled) processes. To the extent administrator 124 is implemented as one or more partially or fully automated processes, administrator may be incorporated into the server 104. In some implementations, administrator 104 may select content to send client 102 based on languages and/or client capabilities identified for the particular mobile device 110.

When client 102 receives a content update from server system 104 via the channel feed, client 102 stores both the channel content and the metadata associated with the content in feed store 114. For example, when client 102 receives a content update for Channel B, client 102 updates Channel B feed 150 in feed store 114. Both Channel B content 154 and the associated Channel B metadata 152 are stored. Channel B feed 150 may be updated multiple times before a subscriber ever accesses it. When a subscriber accesses Channel B through the mobile device 110 user interface, client 102 may retrieve Channel B content 154 (e.g., a SWF file) and Channel B metadata 152 and provide both to media player component 116 (e.g., a media player).

Figure 2:
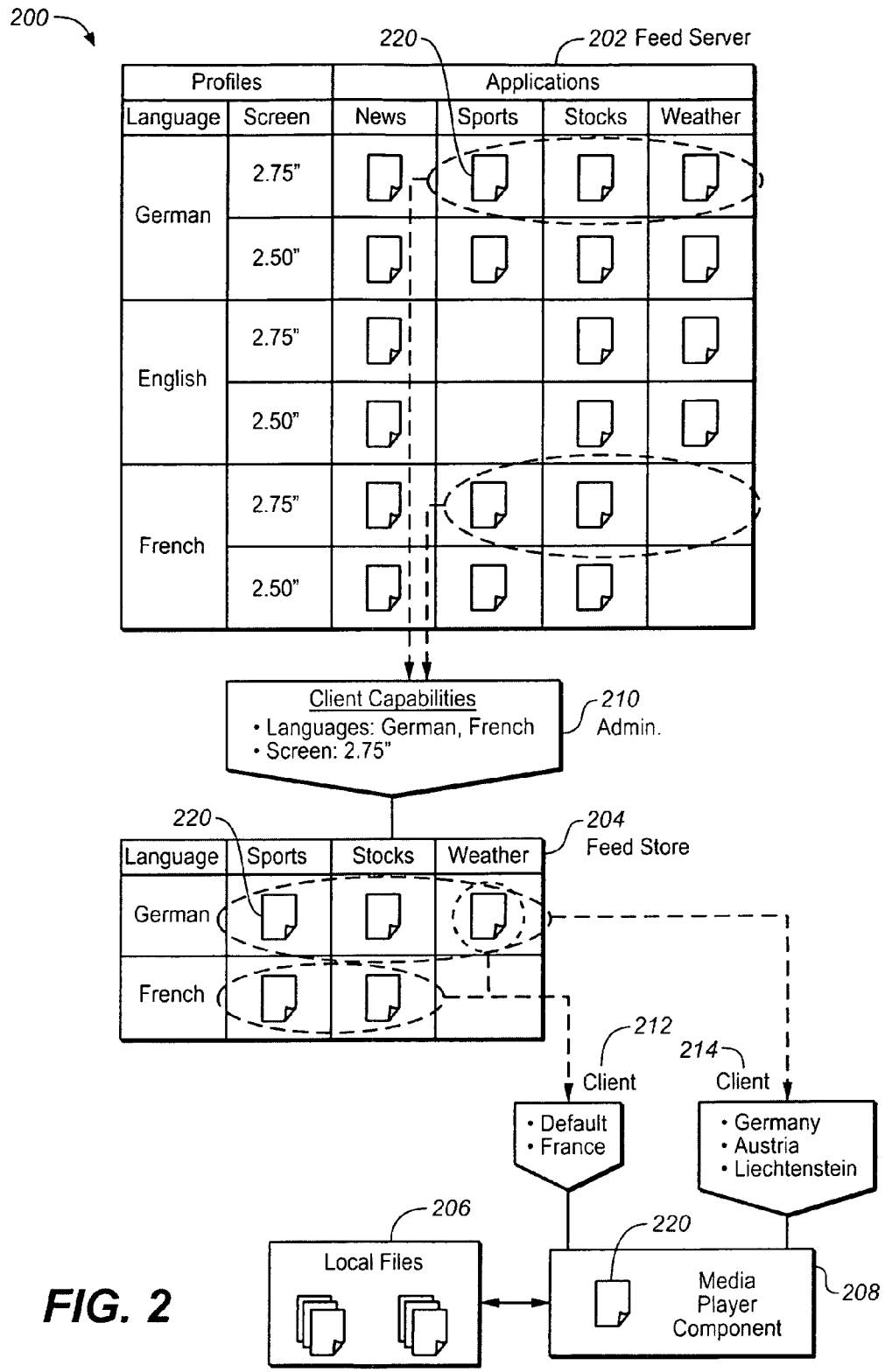
FIG. 2 is a diagram illustrating an example organization of data sets.

FIG. 2 is a diagram 200 illustrating an example organization of data sets in accordance with some aspects of the present disclosure. Generally, diagram 200 represents an example of how data may be organized in a mobile information system. More specifically, diagram 200 represents an example of how a plurality of data sets may be organized and/or distributed from a server to a mobile device in order to allow the mobile device to select, based on a current location, a particular data set that is configured to present channel content in a specific language. Diagram 200 illustrates an organization of and relationships among data sets. For example, the system 100 of FIG. 1 may be implemented based on the concepts illustrated in diagram 200.

At a high level, diagram 200 includes tables 202, 204, 206 and 208, and selection criteria 210, 212, and 214. A table in diagram 200 illustrates an organization of data sets. A selection criteria in diagram 200 illustrates a relationship among data sets in different tables. Table 202 represents an example organization of data typically stored in feed server 122 of server 104. On the left side of table 202, a plurality of profiles are specified, according to three languages (German, English, and French) and two screen sizes (2.5 inches and 2.75 inches). Each of the six combinations of language and screen size may correspond to a particular client capability. Typically a client capability will include more information, and table 202 is intended as a simplified example. Each column on the right side of table 202 represents a particular information channel. Each file icon represents a data set configured for presenting the channel content (specified by the column) according to client capabilities (specified by the row). Some cells do not include a file icon, which indicates that channel content is not available for the client capabilities specified in that row. For example, the channel Sports is available for both screen sizes in German and French but not English.

Selection criteria 210 represents functionality typically attributable to administrator 124 of server 104. Selection criteria 210 indicates that certain data sets are selected from table 202 based on client capabilities. The selected data sets would typically be sent to client 102 via wireless network 106 and stored in feed store 114. In the illustrated example, the client capabilities specify languages German and French and screen size 2.75 inches. Also in the illustrated example, the mobile device represented by the client capabilities subscribes to three channels: Sports, Stocks and Weather. Selection criteria 210 illustrates the five data sets that are selected based on the channel subscriptions and client capabilities of the mobile device 110. The selected data sets are represented as file icons in table 204.

Table 204 represents an example organization of data typically stored in feed store 114 of mobile device 110. On the left column of table 204, the languages specified in client capabilities (German and French) are represented. Each of the second, third and fourth columns of table 204 represent a particular information channel. Each file icon represents a data set selected by selection criteria 210 from table 202. Content for the channel Weather configured for presentation in French is not available, since it was not available in table 202.

Selection criteria 212 and 214 represent functionality typically attributable to client 102 of mobile device 110. Selection criteria 212 and 214 indicates that certain data sets may be selected from table 204 based on a current location. Selection criteria 212 and 214 may represent an association of each language identified in client capabilities with one or more particular location. The association of each language with one or more particular location may be identified by data stored as preferences in local data 112. A selected data set would typically be sent to media player component 116. Selection criteria 214 selects one of the three data sets configured for presentation in German when the current location is Germany, Austria or Liechtenstein. Selection criteria 212 selects one of the three data sets configured for presentation in French when the current location is France. Selection criteria 212 also indicates that French is the default language, which means that one of the three data sets configured for presentation in French is selected when the current location is not associated with a particular language. In the illustrated example, the channel Weather does not have available content configured for presentation in French. Therefore, when the current location is associated with the French language, the data set configured for presentation in German is selected when retrieving content for the channel Weather. Depending on the channel being accessed and the current location, one or more data sets may be sent to media player 116. Table 208 illustrates that a particular data set is selected. The particular data set 220 selected in the diagram 200 is the Sports content configured for presentation in German.

Table 206 illustrates data that may be stored in local data 112 or feed store 114. For example, table 206 represents data stored as shared libraries 180 that may be accessed by media player component 220. In the illustrated example, there may be a shared runtime library that defines text, images, and other data configured for presenting content in French, and another shared runtime library that defines similar items for presenting content in German. The media player component 116 may access the German shared runtime library, for example, by a link provided in data set 220 and/or according to a dynamic selection by the mobile device depending on the currently active language.

Figure 3:
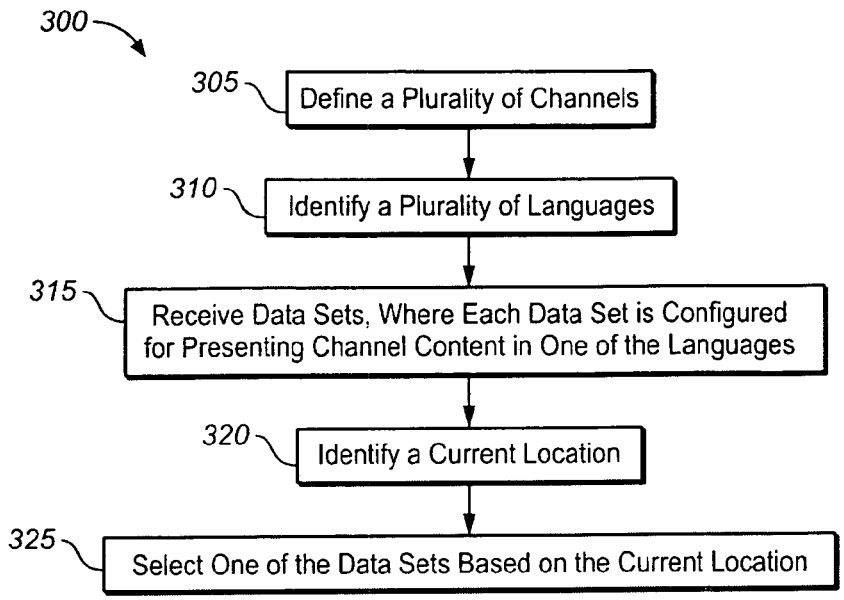
FIG. 3 is a flow chart illustrating an example process of selecting data.

FIG. 3 is a flow chart illustrating an example process 300 of selecting data in accordance with some aspects of the present disclosure. The process 300 may generally be used to select data based on a current location in a mobile device. More specifically, the process 300 may be used to selected a data set configured for presentation in a particular language based on a current location, for example by identifying a language associated with the current location. For example, the process 300 may be implemented by the system 100 of FIG. 1 to select a data set on mobile device 110.

At 305, a plurality of channels are defined. Multiple available channels may be offered by a wireless service provider or by a third party service provider. Mobile devices may then subscribe to or register to receive channel updates for some or all of the available channels. Each channel may be adapted to receive a predetermined type of content in one or more predetermined formats, such that the content may be accessed on the mobile device. For example, the channels News and Baseball Scores may be defined at 305. Content for channels may be received, for example, by client 102 from server 104 over wireless network 106. The content may include media or multimedia data. Additionally, the content may include data defining user interfaces, menus, channel features, and the like. Channel content may be in a variety of formats such as text, images, vector graphics, bitmaps, frame-based animation, video, or in any other format. Channel content may further include executable scripts or other sequences of instructions. The channel content may be read by a media player component and displayed or otherwise presented on the mobile device. As a specific example, the channel Baseball Scores may receive text data identifying all of the Major League Baseball scores for a certain day.

At 310, a plurality of languages are identified. The languages may be defined by a user, for example, by identifying languages in which the user prefers content to be presented. For example, at 310, the languages Japanese and Russian may be identified by a user who is capable in both the Japanese and Russian languages. Languages may be identified automatically, for example, by client 102, or languages may be identified as default languages for a device. An identification of languages may be stored in local memory 112, for example, in preferences. In general, any number of languages may be identified. Typically a subset of one to ten languages may be identified, and the identified languages may correspond to languages that a user can read or speak. Also, each of the identified languages may be associated with one or more locations. The locations associated with the identified languages may, for example, be countries, states, cities, or regions to which the user travels frequently.

At 315, data sets are received, and each data set is configured for presenting channel content in one of the languages. Multiple data sets may represent content for a particular channel and they may be stored as a feed in feed store 114. There may be data sets configured for each of the languages identified at 310. Each data set may include a link to a shared runtime library that corresponds to the language for which the data set is configured. Some of the data received at 310 may include all of, part of, or updates for a shared runtime library. The data sets may be received from server 104 over wireless network 106, and in some implementations the server 104 may include data sets configured for presentation in languages other than the plurality of languages. In some implementations, a data set may be configured for presentation in any of multiple different languages, in which case the mobile device may select among multiple shared runtime libraries for text or other resources to be used in presenting the content.

At 320, a current location is identified. The current location may be identified by the client 102. The current location may be identified as longitude and latitude coordinates (e.g. −97.24 longitude, 31.49 latitude) or as a country, state, city (e.g. USA, California, Sacramento) and/or any other politically, geographically or conceptually defined region. In some implementations, the current location may be identified as a home location or a home network location. Information describing the current location, such as a longitude and latitude, may be identified by a server and used to identify other information describing the current location, such as a country, state, or city name. Some or all of the information describing the current location may be sent to the client 102. A current location may be identified by a wireless global information system, such as a Global Positioning System (or GPS), that uses satellites to identify locations.

At 325, one of the data sets is selected based on the identified current location. The data set may be selected by the client 102 or by another component of the mobile device 110. In some implementations, selecting a data set may include identifying the data set configured for presentation in the language associated with the current location. The client 102 may provide the selected data set to media player 116 for presentation. In some implementations, after selecting a data set based on the current location, a new current location may be identified, and a different data set may be selected based on the new current location.

Figure 4:
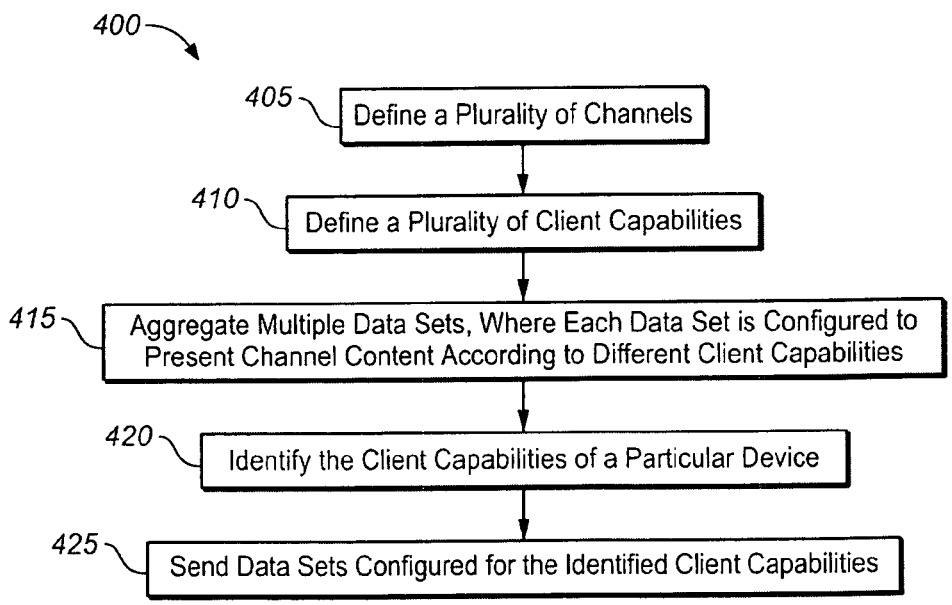
FIG. 4 is a flow chart illustrating another example process of selecting data.

FIG. 4 is a flow chart illustrating an example process 400 of selecting data in accordance with some aspects of the present disclosure. The process 400 may generally be used to select data based on client capabilities, which may include an identification of one or more languages. More specifically, the process may be used to select data sets configured for presentation on a particular mobile device in one or more particular languages. For example, the process 400 may be implemented by the system 100 of FIG. 1 to select data sets for storage on mobile device 110.

At 405, a plurality of channels are defined. At 410, a plurality of client capabilities are defined. The plurality of client capabilities may include all possible client capabilities, a most probable set of client capabilities, or a subset of most frequently occurring client capabilities. At 415, multiple data sets are aggregated, where each data set is configured to present channel content according to different client capabilities. For example, server 104 may aggregate data sets by generating or retrieving data sets configured for presentation in each of multiple languages on each of ten different screen sizes. Data sets may be retrieved, for example, from service providers 118, or data sets may be generated, for example, by administrator 124. At 420, client capabilities of a particular device are identified. For example, client capabilities may be identified based on data received by server 104 over wireless network 106 from client 102. The client capabilities may identify a plurality of languages and specifications of mobile device 110. At 425, data sets identified for the client capabilities of the particular device are sent. For example, the data sets identified for the client capabilities may be sent from server 104 over network 106 to client 102. Typically the sent data sets are only a subset of the aggregated data sets.

The preceding flowcharts and accompanying descriptions illustrate example methods. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, methods may be used with additional steps, fewer steps, and/or different steps, so long as the methods remain appropriate.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method for selecting data on a mobile device, the method comprising:
    defining a plurality of information channels on a mobile device, each information channel adapted to receive, from a content server, a predetermined type of content for access on the mobile device, wherein information channel content is stored in a corresponding segment of a feed store of the mobile device;
    receiving a plurality of data sets for at least one of the information channels, wherein each data set is configured for presentation in a different one of a plurality of languages and each data set includes content for presentation on a corresponding one of the information channels, with the plurality of languages identified by a client capabilities server storing data identifying the plurality of languages for use with the mobile device;
    selecting one of the data sets for presentation on the corresponding information channel based on a current location of the mobile device; and
    presenting content for the information channel corresponding to the selected data set on a user interface of the mobile device by retrieving the selected data set from the corresponding segment of the feed store.

2. The method of claim 1, the method further comprising associating each of the plurality of languages with one or more locations.

3. The method of claim 2 wherein selecting one of the data sets based on the current location includes selecting the data set configured for presentation in the language associated with the current location.

4. The method of claim 1, the method further comprising:
    identifying a new current location; and
    selecting a different one of the data sets based on the new current location.

5. The method of claim 1 wherein at least one of the plurality of data sets is further configured for the mobile device based on at least one characteristic of the mobile device.

6. The method of claim 1 wherein the plurality of data sets are received from a server, and the server includes one or more data sets configured to be presented in a language other than the plurality of languages.

7. The method of claim 1, wherein the current location is a geographic location of the mobile device, and the geographic location is automatically identified by a wireless global information system.

8. The method of claim 1, wherein the current location is a geographic location of the mobile device, and the geographic location is automatically identified by information received at the mobile device from a wireless network.

9. The method of claim 1, wherein at least one of the data sets includes a reference to a shared library, where the shared library includes data configured for presentation in one of the languages.

10. An article comprising a machine-readable medium storing instructions for causing data processing apparatus to perform operations comprising:
    storing data identifying a plurality of languages;
    receiving, from a content server, a plurality of data sets for at least one information channel on a mobile device, wherein each data set is configured for presentation in a different one of the languages and includes information content received from the content server, with the plurality of data sets selected by a client capabilities server, remote from the mobile device, storing data identifying a subset of a plurality of available languages for use in presenting content on the mobile device;
    storing the plurality of data sets for each information channel in one of a plurality of segments of a feed store of the mobile device, with each segment corresponding to one of the information channels;
    identifying a current location of the mobile device;
    selecting one of the data sets for presentation on one of the information channels based on the current location of the mobile device; and
    presenting content for the information channel corresponding to the selected data set on a user interface of the mobile device by retrieving the selected data set from the corresponding segment of the feed store.

11. The article of claim 10 wherein the machine-readable medium stores instructions for causing data processing apparatus to further perform operations comprising presenting the content for the information channel corresponding to the selected data set in response to a user selection on the mobile device.

12. The article of claim 11 wherein presenting the content for the information channel corresponding to the selected data set includes presenting the content using a media player on the mobile device.

13. The article of claim 12 wherein the selected data set includes a reference to a shared library, where the shared library includes data configured for presentation in at least one of the languages.

14. The article of claim 10 wherein the machine-readable medium stores instructions for causing data processing apparatus to further perform operations comprising associating each of the plurality of languages with one or more locations, and wherein selecting one of the data sets based on a current location includes identifying the language associated with the current location.

15. The article of claim 10 wherein the machine-readable medium stores instructions for causing data processing apparatus to further perform operations comprising:
    identifying a new current location; and selecting a different one of the data sets based on the new current location.

16. The article of claim 10 wherein at least one of the plurality of data sets is further configured for presentation on the mobile device based on at least one characteristic of the mobile device.

17. The article of claim 10 wherein the current location is a geographic location of the mobile device, and identifying a current location includes receiving data from at least one of a global information system or a wireless network.

18. A system comprising:
    at least one database operable to store contents for a plurality of available channels, wherein the content includes a plurality of data sets for delivery to mobile devices based on a registration of each mobile device to receive updates for one or more channels; and
    one or more servers adapted to:
        receive an identification of a plurality of languages associated with a particular mobile device;
        identify data sets stored in the database, where each identified data set is configured for presentation in a different one of the languages and is selected based on the received identification of the plurality of languages associated with the particular mobile device; and
        deliver the identified data sets to the particular mobile device based on the registration of the particular mobile device to receive content for one or more information channels, wherein the identified data sets include the information channel content and are adapted for storage in a corresponding segment of a feed store on the particular mobile device for subsequent retrieval and presentation on the particular mobile device in response to a user selection.

19. The system of claim 18 wherein the plurality of data sets includes at least one data set configured for presentation in a language other than the plurality of languages.

20. The system of claim 18 wherein the one or more servers are further adapted to:
    receive content from one or more remote content providers; and
    update content stored in the at least one database for delivery to mobile devices based on the content received from the one or more remote content providers.

21. The system of claim 18 wherein the one or more servers are further adapted to automatically deliver the content updates to each mobile device based on at least one of a predetermined interval, an expiration of content previously delivered to the mobile device, or a message from the mobile device that content previously delivered to the mobile device can be replaced.

22. The system of claim 18 wherein each data set in the group is further configured for presentation on the particular mobile device based on one or more characteristics of the mobile device.

23. The system of claim 22 wherein the plurality of data sets includes at least one data set configured for presentation on a mobile device other than the particular mobile device.

\* \* \* \* \*